US010467170B2

(12) United States Patent
McKnight

(10) Patent No.: US 10,467,170 B2
(45) Date of Patent: Nov. 5, 2019

(54) STORAGE ARRAY INCLUDING A BRIDGE MODULE INTERCONNECT TO PROVIDE BRIDGE CONNECTIONS TO DIFFERENT PROTOCOL BRIDGE PROTOCOL MODULES

(71) Applicant: HEWLETT PACKARD ENTERPRISE DEVELOPMENT LP, Houston, TX (US)

(72) Inventor: Thomas P. McKnight, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 211 days.

(21) Appl. No.: 15/489,698

(22) Filed: Apr. 17, 2017

(65) Prior Publication Data

US 2017/0300445 A1    Oct. 19, 2017

Related U.S. Application Data

(60) Provisional application No. 62/324,301, filed on Apr. 18, 2016.

(51) Int. Cl.
*G06F 13/40* (2006.01)

(52) U.S. Cl.
CPC ........ *G06F 13/4027* (2013.01); *G06F 13/409* (2013.01); *G06F 13/4068* (2013.01); *G06F 2213/0026* (2013.01); *G06F 2213/0028* (2013.01)

(58) Field of Classification Search
CPC . G06F 13/4027; G06F 13/4068; G06F 13/409
See application file for complete search history.

(56) References Cited

U.S. PATENT DOCUMENTS

| 8,949,502 B2 | 2/2015 | McKnight et al. |
| 9,055,044 B2* | 6/2015 | Takagi .................... H04L 67/06 |
| 9,195,530 B1* | 11/2015 | Jean ..................... G06F 13/4027 |
| 2006/0134936 A1* | 6/2006 | Sullivan ................ G06F 13/409 439/61 |
| 2014/0082258 A1* | 3/2014 | Ober ....................... G06F 3/061 711/103 |
| 2015/0186317 A1* | 7/2015 | Kaufmann .......... G06F 13/4027 710/306 |
| 2017/0068628 A1* | 3/2017 | Calciu ................. G06F 13/4022 |
| 2017/0147042 A1 | 5/2017 | Liu et al. |

* cited by examiner

Primary Examiner — Tammara R Peyton

(57) ABSTRACT

A storage array and systems for configuring a storage array are provided. In one example, the storage array includes a motherboard. The motherboard includes a first compute module and an input/output (I/O) mid-plane that is routed to the first compute module. The I/O mid-plane has a plurality of peripheral component interconnect express (PCIe) lanes coupled to the first compute module. A bridge module interconnect is routed to the I/O mid-plane via one or more of the plurality of PCIe lanes of the I/O mid-plane. The bridge module interconnect provides bridge connections to receive to two or more types of protocol bridge modules. A storage mid-plane provides integrated routing between each of a plurality of drive connectors and each of the bridge connections of the two or more types of protocol bridge modules of the bridge module interconnect.

20 Claims, 11 Drawing Sheets

STORAGE ARRAY INCLUDING A BRIDGE MODULE INTERCONNECT TO PROVIDE BRIDGE CONNECTIONS TO DIFFERENT PROTOCOL BRIDGE PROTOCOL MODULES

CLAIM OF PRIORITY

The present application claims priority to U.S. Provisional Application No. 62/324,301, filed on Apr. 18, 2016, which is herein incorporated by reference.

FIELD OF THE DISCLOSURE

The embodiments described in this disclosure relate to storage systems, and in particular, storage systems that enable reconfiguration in accordance with a desired protocol of storage drives, with minimal redesign and engineering.

BACKGROUND

Storage arrays are computer systems that are designed to store data and efficiently serve data to processing applications. Typically, storage arrays are provisioned for entities that require specific storage capacity and performance. Often, one or more storage arrays are provisioned for entities having multiple clients, local or remote, that require efficient access to mission critical data. In some configurations, storage arrays are installed in data centers, where multiple storage arrays are clustered together to deliver either higher storage capacity and/or performance.

Although storage arrays work well, storage arrays are commonly designed by different manufacturers in unique custom configurations. For example, these unique custom configurations provide for routing between compute modules and storage drives that may be connected to the storage array. Although this works, manufacturers of storage arrays must continue to redesign internal systems depending on the types of drives and protocols to be serviced. As the options for drive types and protocols continue to change and evolve, manufacturers of storage arrays also must continue to change their designs, which increases cost and design cycles. What is needed is an infrastructure that enables modularity and capability to be changed with minimal configuration.

It is in this context that embodiments of this disclosure arise.

SUMMARY

Embodiments are provided for a modular motherboard configuration that enables connection of different protocol storage drives via universal-type connectors and preconfigured routing for connecting to specific bridge boards coupled to a bridge module interconnect. The motherboard further includes an I/O mid-plane with pre-wired and routed PCIe lanes and a storage mid-plane with pre-wired and routed connections to drive connectors that can receive connection from different types of drives that follow different protocols.

In one embodiment, a storage array is provided. The storage array includes a motherboard. The motherboard includes a first compute module and an input/output (I/O) mid-plane that is routed to the first compute module. The I/O mid-plane has a plurality of peripheral component interconnect express (PCIe) lanes coupled to the first compute module. A bridge module interconnect is routed to the I/O mid-plane via one or more of the plurality of PCIe lanes of the I/O mid-plane. The bridge module interconnect provides bridge connections to receive to two or more types of protocol bridge modules. A storage mid-plane provides integrated routing between each of a plurality of drive connectors and each of the bridge connections of the two or more types of protocol bridge modules of the bridge module interconnect.

In some embodiments, the first compute module actively uses select ones of the PCIe lanes based the type of protocol bridge modules coupled to the bridge connections to the bridge module interconnect and based on a type of protocol of one or more storage drives connected to the plurality of drive connectors.

In some embodiments, the plurality of drive connectors is configured with routing to each one of the bridge connections of the bridge module interconnect via the storage mid-plane. In one example, any type of protocol of the one or more storage drives connected to the plurality of drive connectors is provided with communication with a corresponding one or more of the protocol bridge modules for the one or more storage drives.

In some embodiments, the two or more types of protocol bridge modules are selected from a serial attached SCSI (SAS) protocol bridge module and a non-volatile memory express (NVME) protocol bridge module.

In some embodiments, the motherboard further includes a bridge board module that provides a passive interface to a predefined set of the plurality of drive connectors for interconnection to a predefined set of NVME storage drives.

In some embodiments, the motherboard further includes a second compute module. The first compute module is provided for a first controller and the second compute module provided for a second controller, and the first and second controllers provide failover compute processing for the storage array. The second compute module is routed to the I/O mid-plane via a corresponding set of the plurality of PCIe lanes. The second compute module is routed to the bridge module interconnect using the corresponding set of the plurality of PCIe lanes.

In some embodiments, the bridge connections of the bridge module interconnect provide communication between the PCIe lanes of the I/O mid-plane and the integrated routing of the storage mid-plane.

In some embodiments, the bridge module interconnect is configured to receive two protocol bridge modules of a serial attached SCSI (SAS) type, and receive storage drives having a SAS circuit.

In some embodiments, the storage drives having the SAS circuit are configured to include storage media selected from a hard disk drive (HDD) or solid state drive (SSD).

In some embodiments, the motherboard further includes a bridge board module that provides a passive interface to a set of four (4) NVME storage drives via two of said drive connectors routed through the storage mid-plane and said first and second compute module routed via eight (8) PCIe lanes.

In some embodiments, the bridge module interconnect is configured to receive two protocol bridge modules of a non-volatile memory express (NVME) type, and receive storage drives having a NVME circuit.

In some embodiments, the storage drives having the NVME circuit are configured to include storage media selected from NVME solid state drives (SSD).

In some embodiments, the motherboard further includes a bridge board module that provides a passive interface to a set of four (4) NVME storage drives via two of said drive connectors routed through the storage mid-plane and said first and second compute module routed via eight (8) PCIe lanes.

In some embodiments, each of the plurality of drive connectors has a plurality of pins that are connected to the integrated routing of the storage mid-plane to provide connection to different protocol type storage drives, and each type of protocol storage drive when connected to a respective drive connector provides interconnection to a corresponding type of protocol bridge module when connected to ones of the bridge connections of the bridge module interconnect.

DETAILED DESCRIPTION

Figure 1:
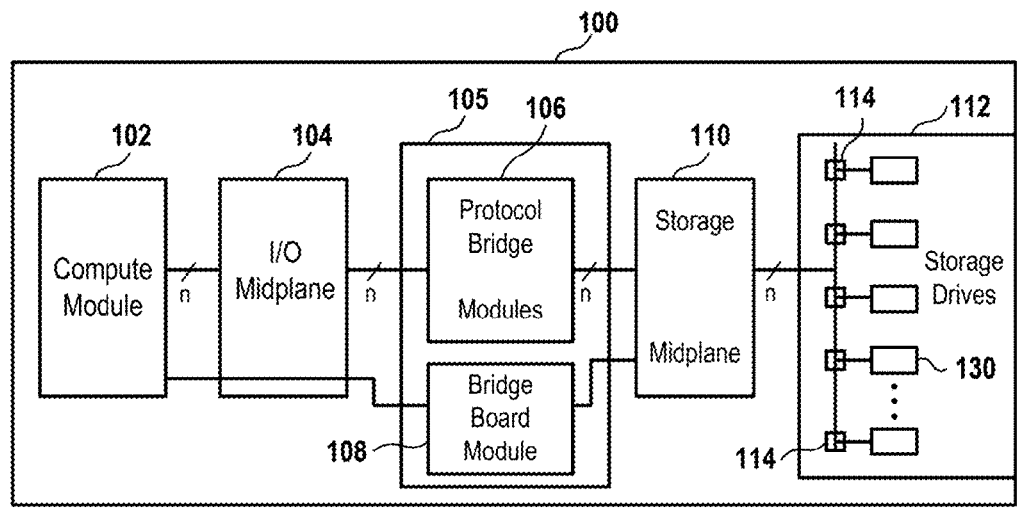
FIG. 1 illustrates a motherboard 100 having components for flexibly changing a configuration of a system based on a desired protocol of storage drives to be used in a storage array.

The disclosed embodiments relate to a storage array that includes an internal motherboard configured that is optimized to operate in multiple configurations of storage protocols. By way of the example, the motherboard has been arranged to separate compute modules from storage modules, which enables customization of the motherboard to operate in any one of a plurality of protocol modes. Depending on the protocol mode, a bridge module interconnect can be configured to receive protocol bridge modules that are selected based on a type of protocol of the storage drives to be connected in the storage array.

The configurability of the storage array is facilitated by the inclusion of an input/output (I/O) mid-plane and a storage mid-plane. The bridge module interconnect is disposed between the I/O mid-plane and the storage mid-plane. In one configuration, the I/O mid-plane has routed therein a plurality of peripheral component interconnect express (PCIe) lanes, which are configured to interconnect protocol bridge modules that are connected to the bridge module interconnect. In one configuration, the storage mid-plane includes a plurality of routed connections between the bridge module interconnect and drive connectors that are to receive storage drives.

The drive connectors, in one configuration, have pin connectors that enable connection to different types of drive protocols. As a result, depending on the configuration of the storage array, the storage array can receive storage drives of a specific protocol type and also receive protocol bridge modules of that specific protocol type. Because the motherboard has the routing in the I/O mid-plane and the storage mid-plane preconfigured to any type of protocol, the interconnection, routing and communication between the storage drives and the compute modules will be made functional, as all routing is already present on the I/O and storage mid-planes.

In some configurations of the storage array, the types of protocol bridge modules are selected from a serial attached SCSI (SAS) protocol bridge module and a non-volatile memory express (NVME) protocol bridge module. For instance, some configurations may require SAS solid state drives (SSDs) or a serial AT attachment (SATA) solid state drives (SSDs). As described below and shown in the figures, one configuration includes providing a storage drive that includes a SAS interposer or circuit, which enables the storage drive to communicate using the SAS protocol. Thus, if storage drives that communicate using the SAS protocol are to be used in the storage array, the bridge module interconnect is adjusted to receive protocol bridge modules to support the SAS protocol.

If the storage array is to be configured to receive NVME storage drives, the bridge module interconnect is adjusted to receive protocol bridge modules to support the NVME protocol. In further configurations, the motherboard may include a second compute module, wherein a first compute module is provided for a first controller and the second compute module is provided for a second controller. Thus, the first and second controllers provide failover compute processing for the storage array. In still another embodiment, the bridge module interconnect may be provided with a bridge board module that provides a passive interface to a set of four NVME storage drives via two of said drive connectors routed through the storage mid-plane.

In this configuration, first and second compute modules are routed via eight PCIe lanes. Thus, it is possible to construct a storage arrays having different configurations of storage drives and storage drives that implement different communication protocols. One advantage, of many, is the flexibility of the motherboard configuration and its flexibility to be changed from one configuration to another. This flexibility provides an ability to reuse the same motherboard for multiple types of storage array product lines that may have different suites of drive configurations and/or drive communication protocols.

FIG. 1 illustrates a motherboard 100 having components for flexibly changing a configuration of a system based on a desired protocol of storage drives to be used in a storage array. The motherboard 100 includes a compute module 102, and I/O mid-plane 104, a bridge module interconnect 105, a storage mid-plane 110, drive connectors 114, and storage drives 112. This configuration shows an embodiment where a single compute module 102 is provided. The motherboard 100 can therefore be integrated into a storage array, defined by the multiple storage drives 130 that may be connected to connectors 114 that are interfaced with the storage mid-plane 110.

As will be described in more detail below, the compute module 102 may include one or more CPUs, dedicated memory (e.g., double data rate fourth-generation synchronous dynamic random-access memory (DDR4×4), buses, interconnect slots, and connections to network interface cards (NICs). The I/O mid-plane 104 is configured to include a plurality of integrated routes for PCIe lanes, which integrate with the compute module 102 and the bridge module interconnect 105. The bridge module interconnect 105 is configured with the capability of receiving different types of protocol bridge modules 106, which are selected based on the type of communication protocol desired for the storage drives 130. The protocol bridge modules 106 may be connected to the bridge module interconnect 105 by way of connectors, which enables specific types of protocol bridge modules 106 to be connected to the motherboard 100, depending on the protocol used for the storage drives 130. In one configuration, a bridge board module 108 may also be provided. The bridge board module 108 can either be a plug-in board module, or an integrated board module that couples to or as part of the motherboard 100. In this configuration, the bridge board module 108 can be provided with passive components, which enable the passing of signals between the storage mid-plane 110 and the I/O mid-plane 104.

Figure 2:
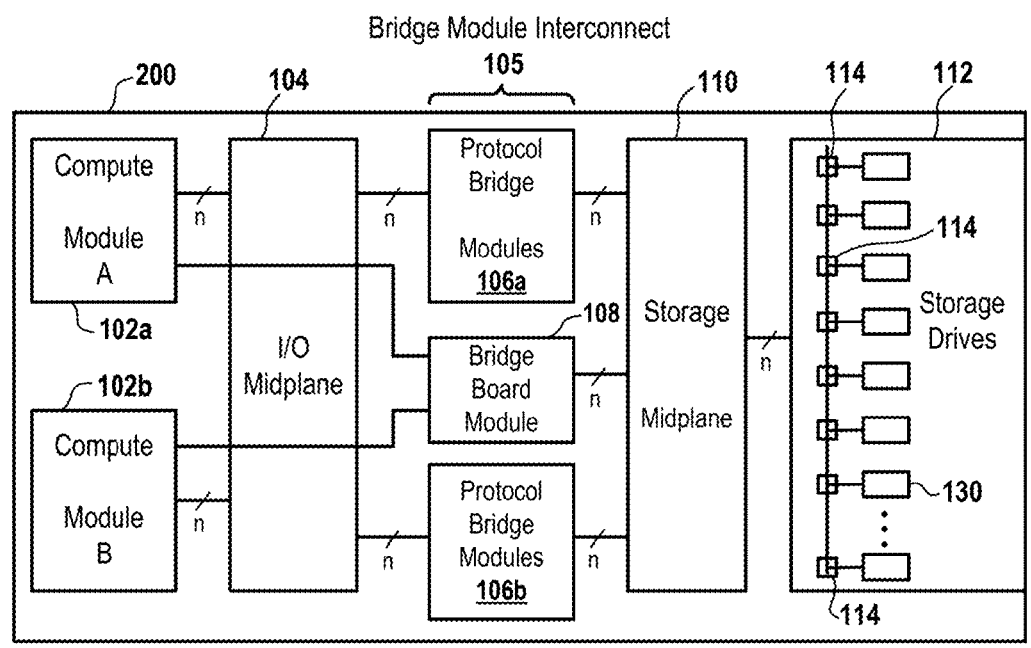
FIG. 2 illustrates another configuration of a motherboard, where multiple compute modules are integrated thereon, to provide a storage array having standby controllers for redundancy.

FIG. 2 illustrates another configuration of a motherboard 200, where multiple compute modules are integrated thereon, to provide a storage array having standby controllers for redundancy. As shown, a compute module A 102a and a compute module B 102b are connected to the motherboard 200, and are respectively connected to the I/O mid-plane 104. In this configuration, the I/O mid-plane 104 also has a plurality of pre-integrated PCIe lanes, which couple to each of the compute modules 102a and 102b. Further shown is integrated connections between each of the compute modules 102a and 102b with the bridge board module 108.

The connections between the I/O mid-plane 104 and the protocol bridge modules 106a and 106b are configured with integrated route lines between the PCIe lanes of the I/O mid-plane 104 and connectors disposed on the motherboard 200 for making communication with the protocol bridge modules that may be connected to said connectors. As will be described in greater detail below, the protocol bridge modules 106a and 106b, are selected based on the type of protocol to be used by the storage drives 130, which are connected to the drive connectors 114. Broadly speaking, the connectors 114 will include connection pins that are suitable to connect to any type of storage drive protocol, and the connection pins are all routed through the storage mid-plane 110 leading to the connectors of the bridge module interconnect 105. This enables a specific type of bridge protocol module 106a and 106b to be inserted into the bridge module interconnect 105 to match the type of storage drives 130 connected to the storage mid-plane 110 via the drive connectors 114.

The storage mid-plane 110 therefore provides integrated routing between the storage drives 130 and the respective connectors 114 and the connector locations in each of the protocol bridge modules 106a and 106b. This configuration allows for a fixed integrated wiring and routing to be disposed in the I/O mid-plane 104 for routing PCIe lanes to the compute modules, and fixed integrated wiring and routing to be disposed in the storage mid-plane 110 that lead to the storage drives 130. In the middle of the motherboard 200 will reside the bridge module interconnect 105, which can be custom tailored to receive protocol bridge modules 106a and 106b for the specific types of storage drives 130 that are to be connected to the drive connectors 114. This configuration of the motherboard 200, and the components integrated therein provide for a flexible packaging form factor that allows for a quick configuration of different types of storage arrays.

Some storage arrays can be configured with different storage drives by simply exchanging the protocol bridge modules 106a and 106b, leaving the integrated routing in the storage mid-plane 110 and the I/O mid-plane 104 intact. This is possible because routing is provided in both the I/O mid-plane 104 and the storage mid-plane 110 in such a way that routing is present depending on the type of protocol being used for the storage drives 130 and the protocol used by the protocol bridge modules 106. If a particular type of protocol bridge module 106 is not being used, the routing leading to connectors in the bridge module interconnect 105 will simply not be used. The same can be said for the drive connectors 114, which may include pins that are not connected to specific storage drives 130 when connected to the drive connector 114.

Figure 3:
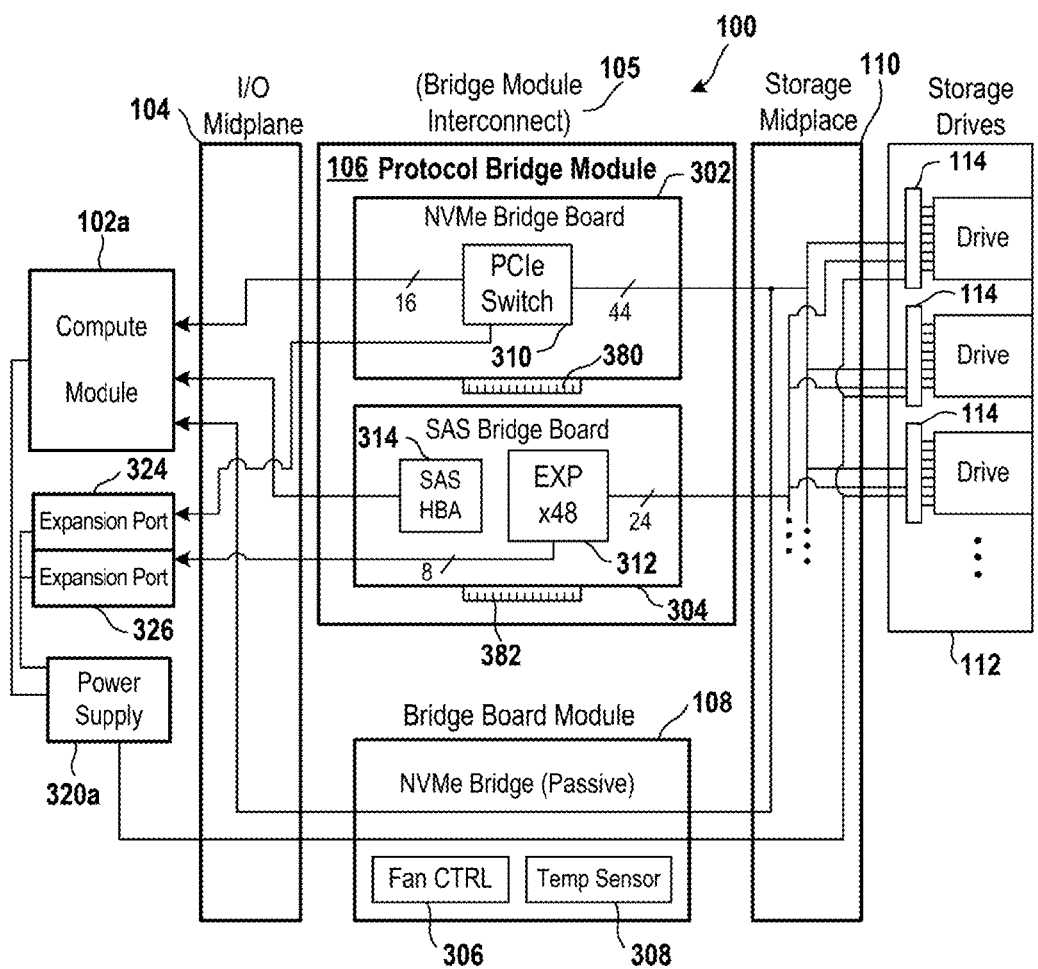
FIG. 3 illustrates a more detailed diagram of the motherboard of FIG. 1, and specific routing between the specific components, in accordance with one embodiment.

FIG. 3 illustrates a more detailed diagram of the motherboard 100 of FIG. 1, and specific routing between the specific components, in accordance with one embodiment. As shown, the compute module 102a is routed to the protocol bridge modules 106, and also to the bridge board module 108. In this illustration, the protocol bridge modules 106 include an NVME bridge board 302 that is coupled to the bridge module interconnect 105 via a connector 380. Further shown is a SAS bridge board 304 coupled to the bridge module interconnect 105 via a connector 382. This illustration is provided to show the option of coupling an NVME bridge board 302 or a SAS bridge board 304 to the bridge module interconnect 105, depending on the design of the storage array, and the type of storage drives 112 that are to be coupled to drive connectors 114.

In a specific implementation, the bridge module interconnect 105 will simply include one or the other of the NVME bridge board 302 and the SAS bridge board 304. Most configurations will not include both bridge boards 302 and 304 at the same time, as the storage drives 130 will dictate which type of bridge board will be connected to the bridge module interconnect 105. However, this illustration is provided to show that one or the other type of bridge board may be coupled to the motherboard 100, defining the functionality and communication protocol of the resulting storage array.

Continuing with the illustration of the protocol bridge modules 106, the NVME bridge board 302 will include a PCIe switch 310, which can communicate with a plurality of integrated routed lines via the storage mid-plane 110 to each of the storage drives 112 coupled to the storage array. If the configuration of the storage array is to support SAS drives or SATA drives, then the SAS bridge board 304 can be connected by way of connector 382 to the bridge module interconnect 105, instead of the NVME bridge board 302. The SAS bridge board 304 is also provided with an EXP x48 chip 312 and a SAS host bus adapter (HBA) chip 314.

It should be understood that the example chips provided on the bridge boards can be changed, depending on the number of buses, processing power, operations, and other design considerations. In accordance with one embodiment of the present invention, the routing to each one of these bridge boards is configured to be integrated into the I/O mid-plane 104 for communicating PCIe lanes to the compute module 102a and integrated routing in the storage mid-plane 110 to each of the drive connectors 114.

This illustration also shows that the bridge board module 108 is a passive NVME bridge board, which allows NVME connection to selected drive connectors 114 of the storage array. In one configuration, a set number of drive connectors 114 will be prewired with the passive connections. In some embodiments, the bridge board module 108 may also include a fan control 306 and temperature sensors 308, among other components. Furthermore, it is shown that the power supply 320a can provide power to components disposed in the bridge board module 108 as well as to other bridge module interconnect 105 boards and the storage drives 112.

Further shown is the ability of the motherboard 100 to include predefined connections between the protocol bridge modules 106 and expansion ports 324 and 326. This provides for expansion outside of the storage array, such as to couple more than one or multiple storage arrays to form a cluster, or other larger storage configuration. Broadly speaking, the I/O mid-plane 104 is also referred to as a controller I/O mid-plane, as this I/O mid-plane 104 provides access to compute module 102a.

Figure 4:
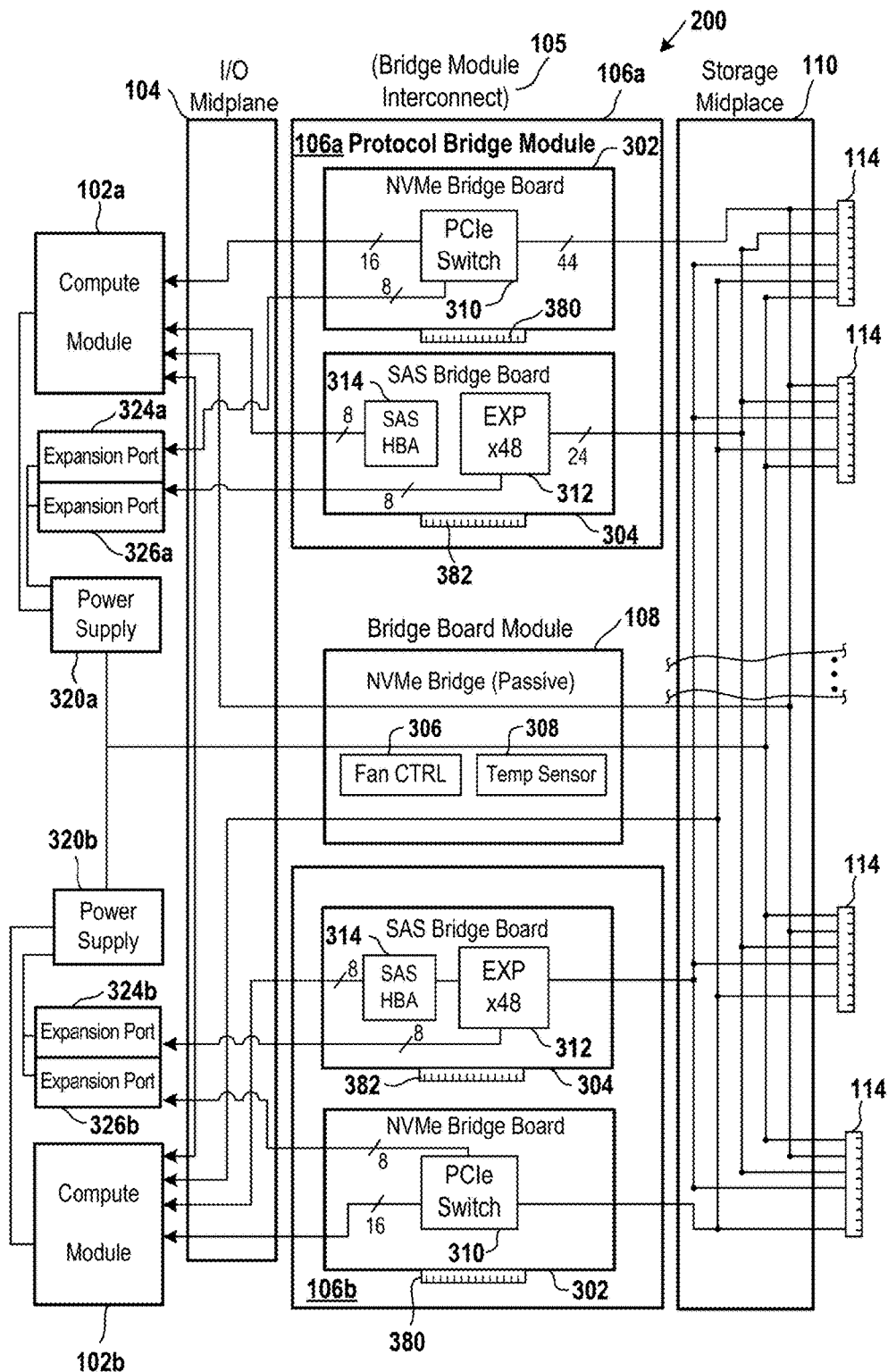
FIG. 4 provides a more detailed diagram of an example motherboard, as shown in FIG. 2.

FIG. 4 provides a more detailed diagram of an example motherboard 200, as shown in FIG. 2. In this illustration, it is shown that a first compute module 102a and a second compute module 102b are respectively interconnected to the I/O mid-plane 104. As mentioned above, the I/O mid-plane 104 is configured to route PCIe lanes to and from the compute modules 102a and 102b. This configuration would be used when the compute modules provide for redundancy, such as for failover protection in a storage array. By way of example, the upper half of the illustrated motherboard 200 may be associated with a first controller A and the bottom half may be associated with a second controller B, and the respective protocol bridge modules 106a and 106b will service the respective controllers.

In the case of a failover, where an active controller fails or is required to proceed with storage processing applications, a standby controller can actively take its place and resume its storage tasks without risking loss of data or access to data. This example also shows the integration of power supply 320a in association with compute module 102a and power supply 320b in association with compute module 102b. Respective expansion ports 324a and 326a are associated with compute module 102a, and expansion ports 324b and 326b are associated with compute module 102b.

This illustration of FIG. 4 is provided to show that the bridge module interconnect 105 can be populated with NVME bridge boards 302 for interfacing with compute modules 102a and 102b via the I/O mid-plane 104 and the drive connector 114 via the storage mid-plane 110. Alternatively, the bridge module interconnect 105 can be populated with SAS bridge boards 304 for interfacing with compute modules 102a and 102b via the I/O mid-plane 104 and the drive connector 114 via the storage mid-plane 110. It is also shown in more detail that the storage mid-plane 110 will include preconfigured routing between the storage connectors 114 and each of the locations where connectors 380 and 382 are disposed in the bridge module interconnect 105. This allows for different types of protocol bridge modules 106a and 106b to be connected to the respective connectors 380 and 382 that service the compute modules 102a and 102b.

The bridge board module 108 is also shown disposed between the compute modules 102a and 102b, and as noted above this bridge board module 108 provides for a passive NVME bridge. The passive NVME bridge provides direct connection to select ones of the storage connectors 114, no matter the type of protocol bridge board 106 that may be connected to the bridge module interconnect 105. In one specific embodiment, the bridge board module 108 will provide eight (8) PCIe lanes for connecting to four (4) storage connectors 114. These four (4) storage connectors 114 may be provided with high-performance NVME storage drives 130b, as shown below in FIG. 5C. The remaining storage drives 130 connected to the remaining storage connectors 114 may be selected depending on whether and NVME bridge boards 302 or SAS bridge boards 304 were connected to the bridge module interconnect 105.

Figure 5A:
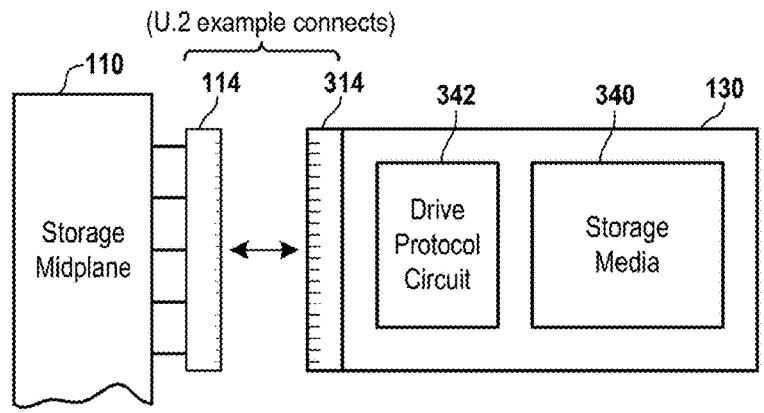
FIG. 5A illustrates an example of storage drive, being a generic storage drive, connected to the drive connector that couples with routed interconnected wiring of the storage mid-plane.

FIG. 5A illustrates an example of storage drive 130, being a generic storage drive, connected to the drive connector 114 that couples with routed interconnected wiring of the storage mid-plane 110. As shown, the storage drive 130 will include a connector 314, which is insertable into the drive connector 114. The storage drive 130 will include a drive protocol circuit 342 and storage media 340. The type of drive protocol circuit 342 will depend on the type of storage media 340, and the protocol. Broadly speaking, the drive protocol circuit 342 can be defined by one or more circuits, chips, integrated logic, and other communication and electrical wiring. The storage media 340 is designed to store data, and the form will depend upon the type of storage media 340 to be part of the storage drive 130. In accordance with one configuration, the connector 314 will have specific pins that will connect into the drive connector 114.

However, in accordance with one embodiment, only the pins of connected 314 that relate to the protocol of the storage drive 130 will make contact with the specific pins within drive connector 114. Therefore, there will be pin connections in the drive connector 114 that will be unused, simply because the storage drive 130 is not of that type of protocol.

In one embodiment, the drive connector 114, and by way of example, may be a connector referred to as a U.2, SFF 8634 or SFF-8639 connector. This type of connector provides the ability to support connection to storage drives 130 that have an interface to the connector, but will only be active depending on the pins that may contact with specific pins of the U.2 connector. If the drive is of a particular protocol, only certain ones of the pins on the drive will make contact to specific pins in the U.2 connector, thus leaving other pins inactive. Again it is emphasized that the U.2 connector is only one example of a connector that can receive connection from different types of drives, and may contact only the pins that relate to that specific protocol. It is envisioned that as protocols change and or bandwidth and/or design needs are modified, different connectors that provide the same functionality or modularity can be used and may replace the U.2 connector example provided herein.

Figure 5B:
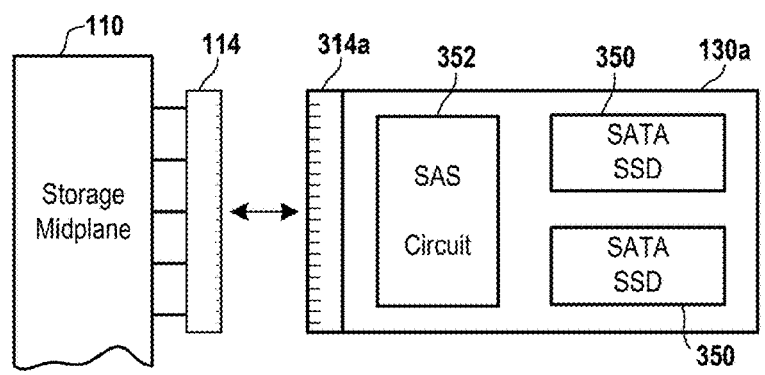
FIG. 5B illustrates an example of a storage drive, which includes a SAS circuit.

FIG. 5B illustrates an example of a storage drive 130a, which includes a SAS circuit 352. The SAS circuit 352 may be viewed as an interposer circuit, which allows for conversion of communication signals coming from SATA SSD storage media 350 of the storage drive 130a. The result is that the storage drive 130a, by way of the SAS circuit 352, will be connecting to the drive connector 114 using connector 314a in accordance with a SAS protocol. Therefore, the pins for the SAS protocol will be exposed by connector 314a, and the drive connector 114 will only make contact with those pins that are for the SAS protocol, leaving other pins unused.

Figure 5C:
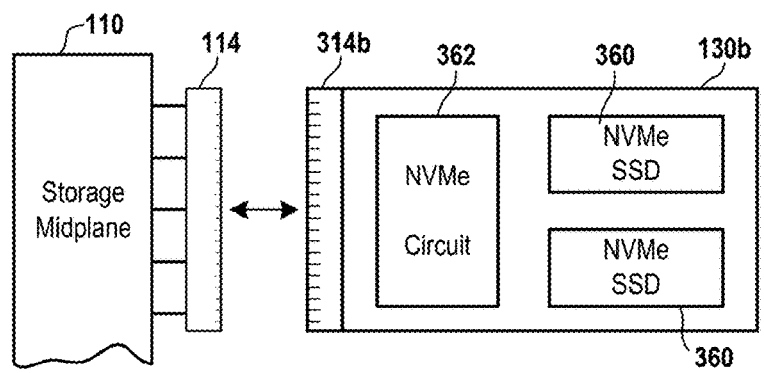
FIG. 5C illustrates an example of a storage drive, which includes an NVME circuit, and NVME SSD storage media.

FIG. 5C illustrates an example of a storage drive 130b, which includes an NVME circuit 362, and NVME SSD storage media 360. In this configuration, the connector 314b will have pins that correspond to connectors used for the NVME protocol, and therefore when connected to the drive connector 114, only those pins within drive connector 114 that correspond to the NVME protocol will be used, leaving the other pins unused. Because connections between the drive connector 114 and the storage mid-plane 110 will include routing for any type of protocol, depending on the type of pins that make contact with the drive connector 114, will dictate which of the lines that are routed in the storage mid-plane 110 will eventually be activated and will be communicating with the respective protocol bridge modules 106 that may be connected to the bridge module interconnect 105.

Figure 5D:
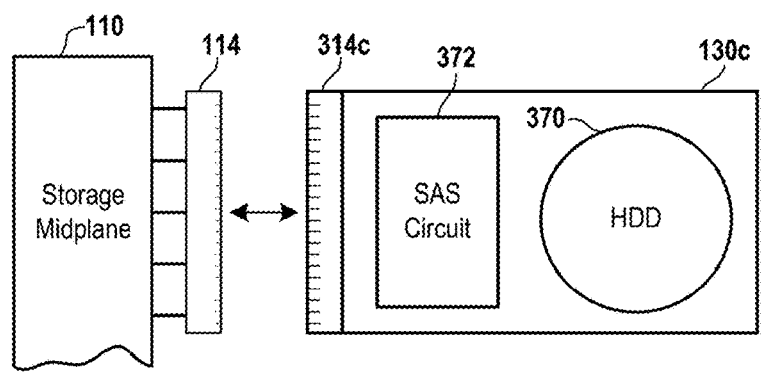
FIG. 5D illustrates another embodiment, where a storage drive is provided with a SAS circuit, for a hard disk drive (HDD).

FIG. 5D illustrates another embodiment, where a storage drive 130c is provided with a SAS circuit 372, for a hard disk drive (HDD) 370. The connector 314c, will therefore communicate using the SAS protocol and therefore the pins in drive connector 114 associated with the SAS protocol will be making contact and the remaining will remain unused. The flexibility provided by this design, and integration of drive connector 114 with a storage mid-plane 110 provides for the flexibility of connecting any type of storage drive 130, which may be able to meet with drive connector 114 and utilize only those pins consistent with the protocol of the storage drive 130.

Figure 6:
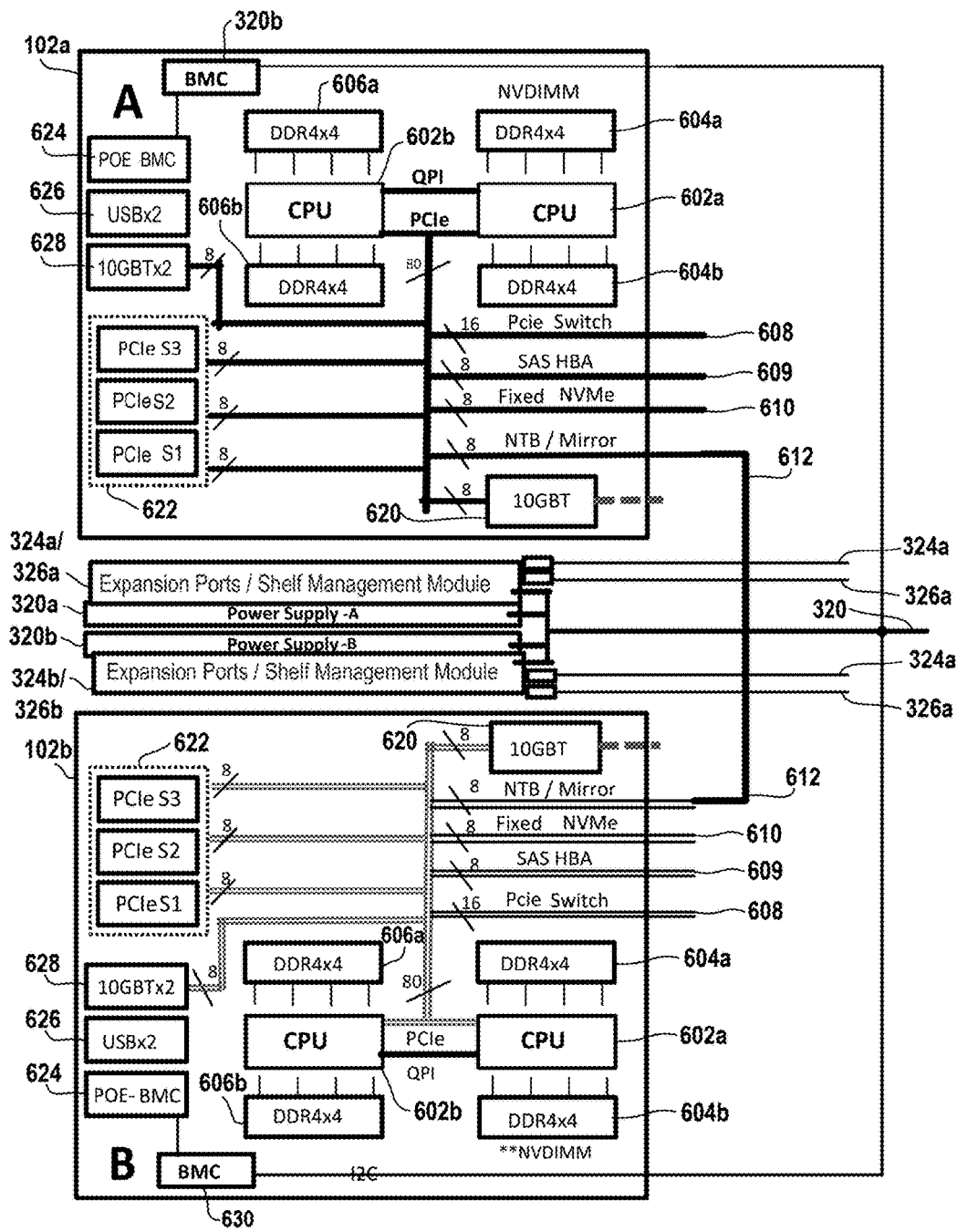
FIG. 6 illustrates one example of compute modules, in accordance with one embodiment.

FIG. 6 illustrates one example of compute modules 102a and 102b, in accordance with one embodiment. As shown, the compute modules 102 includes CPUs 602a and 602b, which are respectively coupled to memory 604a, 604b, 606a, and 606b. Further shown is that PCIe lanes coming from the I/O mid-plane 104 couple to specific lanes within the compute module 102a and 102b. As shown, PCIe lanes from the I/O mid-plane 104 couple to PCIe switch 608, SAS HBA 609, fixed NVME 610, and NTB/Mirror 612 that couples between the two compute modules 102a and 102b. An internal bus then communicates with separate PCIe slots (S1, S2, S3) 622.

The slots can be connected to specific cards that provide an interface to communicate with different types of networking protocols. By way of example, the networking protocol can be an Ethernet connection, a Fibre Channel connection, a mixed connection, or various other high-speed connectors that allow for the storage array to be connected to a network and/or other devices. For more information regarding the integrated PCIe slots 622, reference may be made to U.S. Pat. No. 8,949,502, entitled "PCIe NVRAM card based on NVDIMM," issued on Feb. 3, 2015, which is incorporated herein by reference.

The internal bus is also shown connected to a PCIe Lane that communicates between the two CPUs 602a and 602b. Further, the internal bus communicates with an integrated 10GBT×2 connector/interface 628. The compute modules also include an USB×2 connector 626, a POE (Power-Over-Ethernet)-BMC connector 624, and a (Baseboard Management Controller) BMC 630 that couples to the respective power supplies 320a and 320b. The internal bus is further shown connected to an internal 10GBT module 620, which can be provided to communicate with other internal components of the storage array. As noted above, expansion ports 324a and 324b, and expansion ports 326a and 326b, are further integrated between the compute modules 102a and 102b.

The specific configuration of these example compute modules 102a and 102b can change depending on the design power of the system, based on technology improvements, based on necessity for additional connections to the internal bus, and other design requisites. However, embodiments of the present design allow for each of the connections between the compute modules 102a and 102b to be routed to the various PCIe lanes that will be coupled directly to the I/O mid-plane 104 that are prewired to the specific locations of connectors 380 and 382 for receiving specific protocol bridge modules 106, depending on the drive configuration of the storage array.

Figure 7:
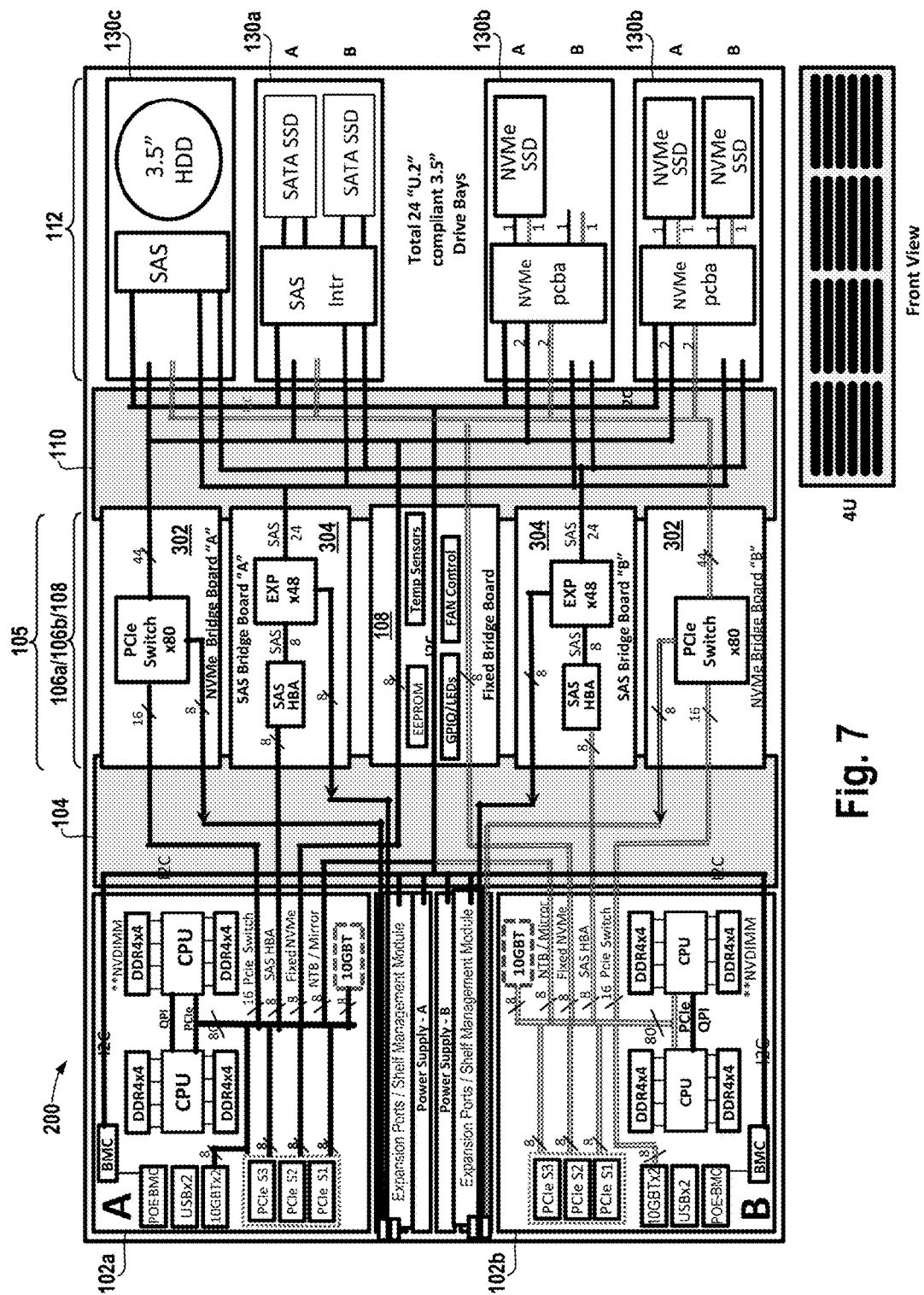
FIG. 7 illustrates a detailed diagram of motherboard, which may be integrated into a storage array, in accordance with one embodiment.

FIG. 7 illustrates a detailed diagram of motherboard 200, which may be integrated into a storage array, in accordance with one embodiment. In this example, it is possible to define a storage array that is a 4U storage array. In the illustrated front view of the 4U storage array, it is shown that 24 3.5" drive bays can be provided, which may be a U.2 connector compliant. As mentioned above, reference to the U.2 connector is only by way of example, and other connectors having or providing similar functionality may be used. An aspect of the described embodiments is that the I/O mid-plane 104 has pre-routed PCIe lanes integrated directly into the motherboard 200, which interfaces the compute modules 102a and 102b with the bridge module interconnect 105.

This illustration of FIG. 7 also shows a fully populated bridge module interconnect 105, which includes both NVME and SAS bridge boards 302 and 304. However, as mentioned above, in a functional configuration the motherboard is preferably populated with either the SAS bridge boards 304 or the NVME bridge boards 302. This illustration also shows that bridge aboard module 108 has eight (8) routed PCIe lanes coupled in a fixed configuration to four (4) NVME SSDs and storage drives 130b. In one embodiment, these NVME slots can be used for right buffer and/or hybrid flash cache operations.

For example, if the protocol bridge modules 106 that are populated are only the SAS bridge boards 304, the bridge board module 108 can still provide the eight (8) PCIe lanes to the dedicated NVME drives. In other embodiments, it is possible to omit the bridge board module 108, if the dedicated PCIe lanes are not desired. Further, it is possible to design the bridge board module 108 to either be fixed on the motherboard 200, or connected to the motherboard 200 in a similar way that the protocol bridge modules 106 are connected.

Figure 8:
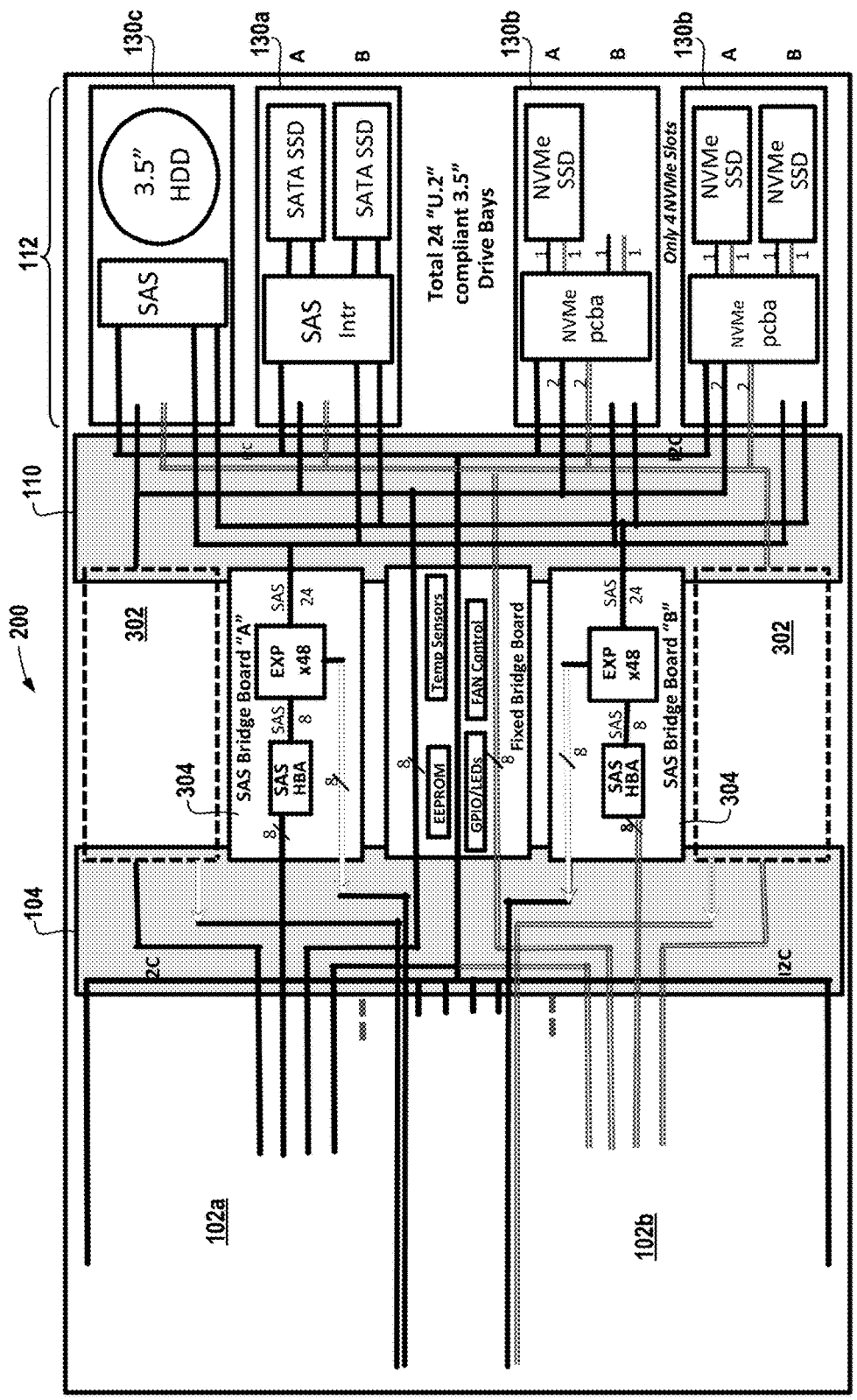
FIG. 8 illustrates an example of the motherboard, having been configured with SAS bridge boards, and omitting the NVME boards.

FIG. 8 illustrates an example of the motherboard 200, having been configured with SAS bridge boards 304, and omitting the NVME boards 302. The reason for omitting the NVME boards 302 is that this storage configuration will be designed for storage drives 130a, having a SAS interposer, which can communicate with SATA SSD drives. For more reference regarding the use of a SAS interposer, reference may be made to U.S. patent application Ser. No. 14/949,837, entitled "Storage Array Having Multi-Drive Sled Assembly," filed on Nov. 23, 2015, which is herein incorporated by reference. As mentioned above, the fixed bridge, referred to as the bridge board module 108 is still able to route to PCIe lanes to the four NVME SSD drives, which are part of NVME drives 130b.

Figure 9:
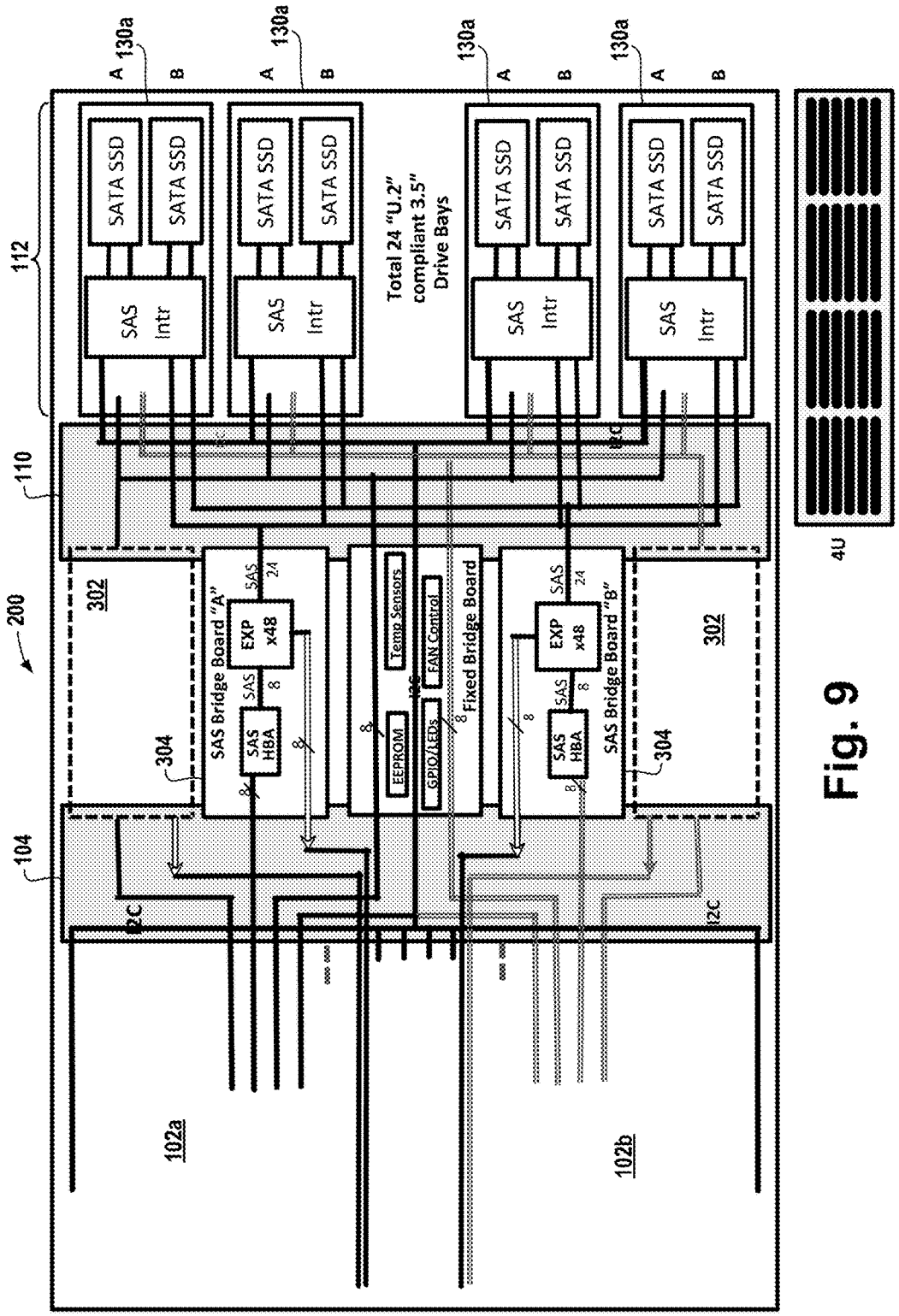
FIG. 9 illustrates another configuration of motherboard of a storage array, in accordance with one embodiment.

FIG. 9 illustrates another configuration of motherboard 200 of a storage array, in accordance with one embodiment. This illustration shows that the same SAS bridge boards 304 are maintained, but the drive slots of all the storage drives 130a have been occupied with dual SATA SSDs, which are connected through the SAS interposer's to the connectors 314 that couple to the connectors 114 of the storage mid-plane 110. Thus, it is possible to populate all of the drive bays of the storage array and not connect any of the NVME drives 130b, since the drive connectors 114 can meet to any type of drive connector 314 pending on the protocol, which utilize the specific pins for the respective protocols.

Figure 10:
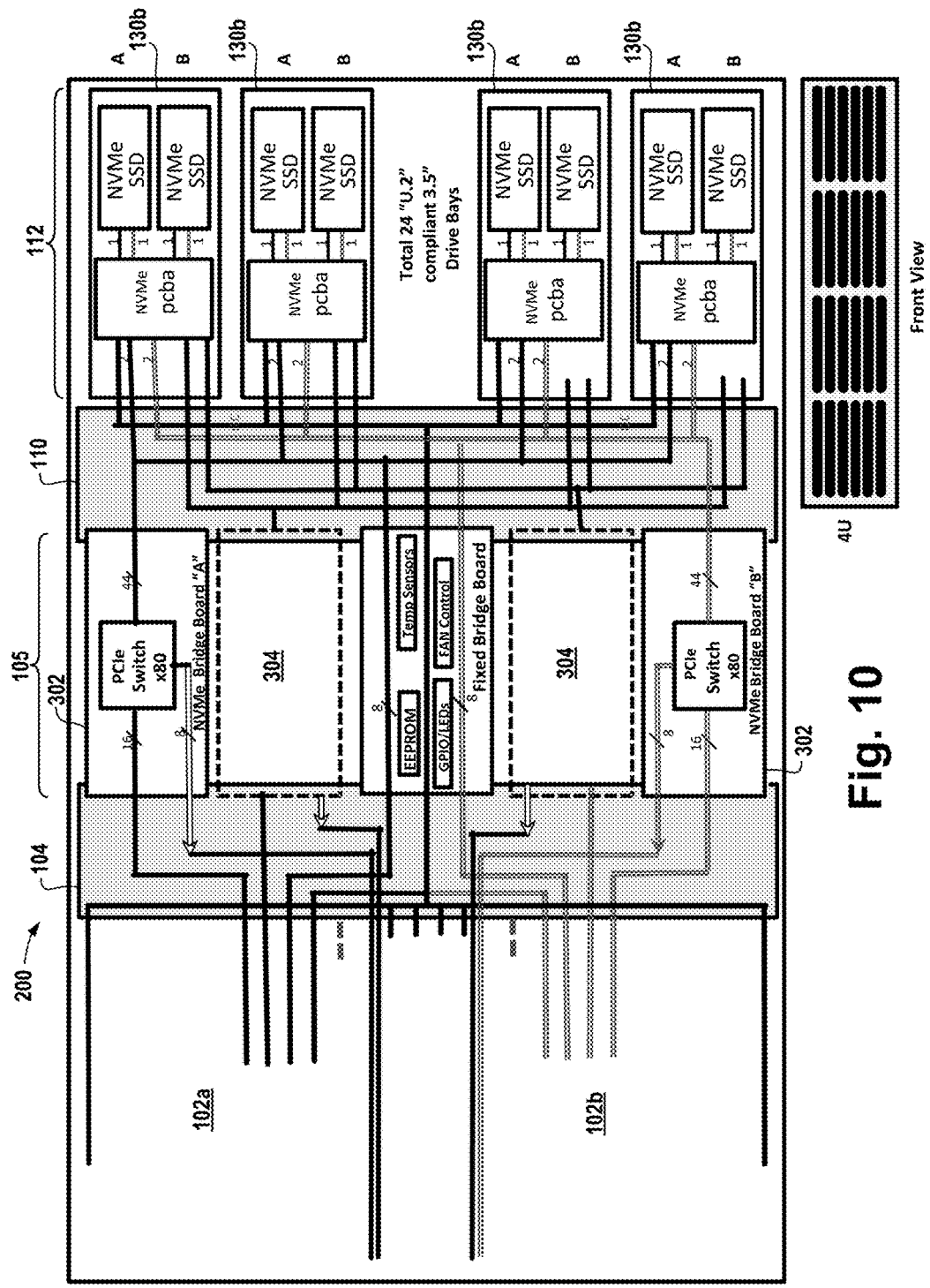
FIG. 10 illustrates another embodiment of the motherboard where the bridge module interconnect is populated with NVME bridge boards, instead of the SAS bridge boards.

FIG. 10 illustrates another embodiment of the motherboard 200 where the bridge module interconnect 105 is populated with NVME bridge boards 302, instead of the SAS bridge boards 304. This simple connection of the NVME bridge boards 302 to the bridge module interconnect 105, will therefore enable communication with storage drives 130b, which include SSDs that communicate using the NVME protocol. In this example, all 24 drive bays, which utilize U.2 compliant connectors for interfacing between drive connectors 114 and connectors 314 (discussed in FIGS. 5A-5D above), will enable the specific storage drives to communicate with the storage mid-plane 110.

Figure 11:
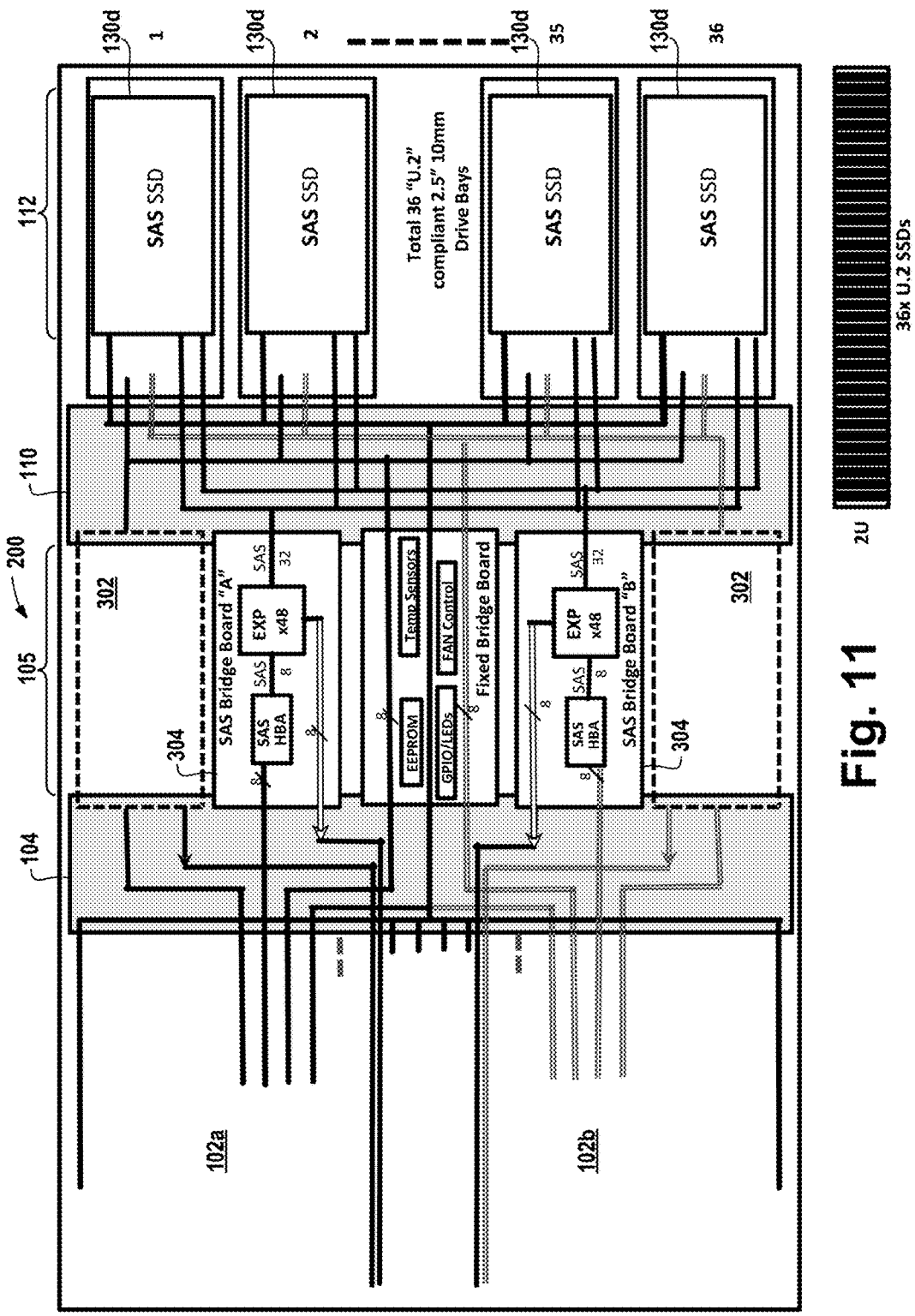
FIG. 11 illustrates another embodiment of the motherboard, where SAS bridge boards 304 have been connected to the bridge module interconnect, so as to connect and communicate with storage drives.

FIG. 11 illustrates another embodiment of the motherboard 200, where SAS bridge boards 304 have been connected to the bridge module interconnect 105, so as to connect and communicate with storage drives 130d. In this example, the construction of the storage array will enable a 2U form factor that allows for 36 U.2 SSDs. The storage drives 130d are shown to be SAS protocol solid-state drives (SSD's). This configuration has been shown to illustrate that the storage mid-plane 110 and the I/O mid-plane 104 will remain fully integrated and routed, and the only modifications required will be to insert the proper bridge board into the motherboard 200 and insert the desired type of storage drives that communicate with connectors 114.

Figure 12:
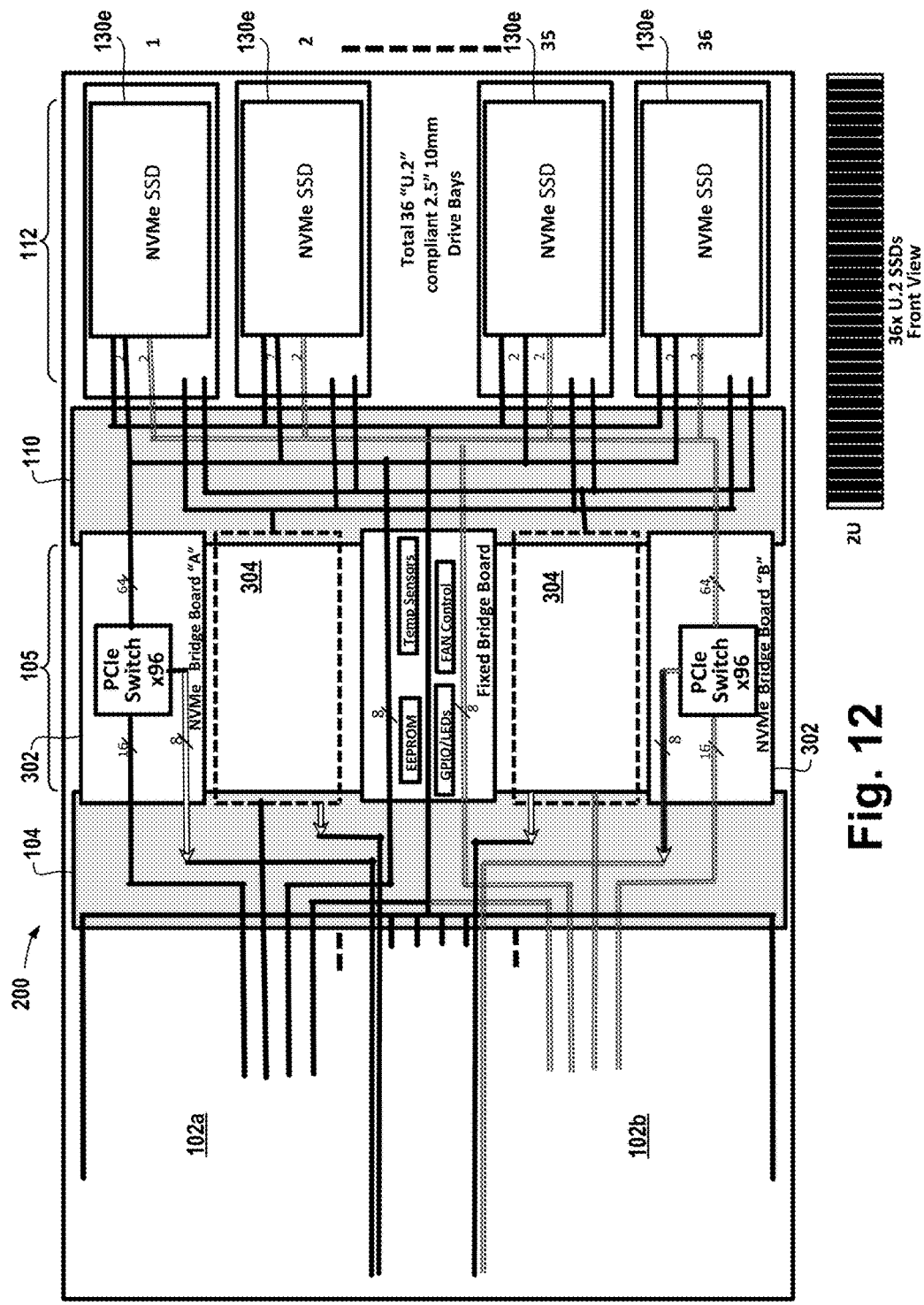
FIG. 12 illustrates yet another example where the motherboard has been modified to receive NVME bridge boards, to enable the construction of a storage array that can hold 36 U.2 SSDs in a 2U form factor.

FIG. 12 illustrates yet another example where the motherboard 200 has been modified to receive NVME bridge boards 302, to enable the construction of a storage array that can hold 36 U.2 SSDs in a 2U form factor. The illustration of FIG. 12 is similar to the embodiment of FIG. 11. However, by simply changing the bridge boards connected to the bridge module interconnect 105, is possible to instantly allow for different types of storage drives of different protocol configurations to be connected to the motherboard 200 by way of the connectors 114 that couple to the storage mid-plane 110. In this example, it is shown that 36 NVME storage drives 130e have been coupled to the storage mid-plane 110, and are provided with communication that has been pre-integrated and wired to the connectors that allow connection of the NVME bridge boards 302.

These examples were provided to show the substantial advancement in the design and packaging of storage arrays. By simple modifications to what is plugged in to the bridge module interconnect 105, the personality (i.e., functionality) of the storage array is instantly changed to a specific type of storage array that can handle different types of storage drive protocols. The integrated design within the I/O mid-plane 104 and the storage mid-plane 110 enable for a consistent motherboard design that can integrate to the types of storage drive protocols being utilized. The I/O mid-plane 104 further provides a simplified connection of integrated PCIe lanes, which remove the complexity of designing compute modules specific for different connections to different protocols. In accordance with the embodiments described herein, designers of storage array motherboards and infrastructure can simply design a system by plugging in different bridge boards that are consistent with the protocol of the storage drives that are to be connected to the storage array.

As used herein, the NVME protocol is also referred to by the acronym NVMe. Generally, an NVME protocol is a communications interface developed for SSDs. For example, the NVME protocol is designed to take advantage of the unique properties of pipeline-rich, random access, memory-based storage.

One or more processing functions can also be defined by computer readable code on a non-transitory computer readable storage medium. The non-transitory computer readable storage medium is any non-transitory data storage device that can store data, which can thereafter be read by a computer system. For example, the processing operations performed by any one of the modules may include computer readable code, which is or can be executed. The code can be, in some configurations, embodied in one or more integrated circuit chips that execute instructions of the computer readable code. In some examples, the integrated circuit chips may be in the form of general processors or special purpose integrated circuit devices. In some cases, the processing may access memory for storage in order to render one or more processing operations.

By way of example, the storage controller of the storage array can include a processor, one or more memory systems and buses for exchanging data when processing storage access operations. In some embodiments, the storage array may include redundant systems, such as an active controller and a standby controller. The active controller operates as the primary computing system for the storage array, while the standby controller is ready to take over during a failover operation. In each case, a controller, e.g., storage controller is configured to interface with connections and electronics of a backplane to interface to the many storage drives of the storage array. In this case, the storage array 101 includes many sled assemblies, of which may include one or two SSD drives. Furthermore, the storage array may be a hybrid system, wherein the both HDDs and SSDs make up the storage capacity of the storage array. These examples are simply provided to illustrate the integrated computing nature of a storage array and the tight interchange needed with drives, e.g., HDDs and SSD, which forms the physical storage of the storage array. Still further, other examples of non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Further, for method operations that were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A storage array, comprising:
   a motherboard comprising:
   a first compute module;
   an input/output (I/O) mid-plane routed to the first compute module, the I/O mid-plane having a plurality of peripheral component interconnect express (PCIe) lanes coupled to the first compute module;
   a bridge module interconnect routed to the I/O mid-plane via one or more of the plurality of PCIe lanes of the I/O mid-plane, the bridge module interconnect providing bridge connections to removably receive a plurality of types of protocol bridge modules that correspond to respective different protocol types of storage devices, the bridge module interconnect flexibly configurable to a plurality of different configurations depending upon which of the plurality of types of protocol bridge modules are received by the bridge connections; and
   a storage mid-plane providing integrated routing between each of a plurality of storage device connectors and each of the bridge connections of the bridge module interconnect, the plurality of storage device connectors connectable to storage devices of a respective protocol type of the different protocol types of storage devices.

2. The storage array of claim 1, wherein the first compute module is to actively use select PCIe lanes of the plurality of PCIe lanes based on a type of protocol bridge module coupled to a bridge connection of the bridge connections of the bridge module interconnect, and based on the protocol type of the storage devices connected to the plurality of drive connectors.

3. The storage array of claim 1, wherein the plurality of storage device connectors is configured with routing to each one of the bridge connections of the bridge module interconnect via the storage mid-plane, such that storage devices of any of the different protocol types connected to the plurality of storage device connectors are provided with communication with a corresponding protocol bridge module of the plurality of protocol bridge modules that is connected to the bridge module interconnect.

4. A storage array comprising:
   a motherboard comprising:
   a first compute module;
   an input/output (I/O) mid-plane routed to the first compute module, the I/O mid-plane having a plurality of peripheral component interconnect express (PCIe) lanes coupled to the first compute module;
   a bridge module interconnect routed to the I/O mid-plane via one or more of the plurality of PCIe lanes of the I/O mid-plane, the bridge module interconnect providing bridge connections to receive two or more types of protocol bridge modules, wherein the two or more types of protocol bridge modules are selected from a serial attached SCSI (SAS) protocol bridge module and a non-volatile memory express (NVME) protocol bridge module;
   a storage mid-plane providing integrated routing between each of a plurality of drive connectors and each of the bridge connections of the bridge module interconnect and
   a bridge board module that provides a passive interface to a predefined set of the plurality of drive connectors for interconnection to a predefined set of NVME storage drives.

5. The storage array of claim 1, further comprising:
   a second compute module integrated in the motherboard, the first compute module provided for a first controller, and the second compute module provided for a second controller, wherein the first and second controllers provide failover compute processing for the storage array,
   wherein the second compute module is routed to the I/O mid-plane via a corresponding set of the plurality of PCIe lanes,
   wherein the second compute module is routed to the bridge module interconnect using the corresponding set of the plurality of PCIe lanes, and
   wherein the bridge connections of the bridge module interconnect provide communication between the PCIe lanes of the I/O mid-plane and the integrated routing of the storage mid-plane.

6. The storage array of claim 5, wherein the bridge module interconnect is configured to receive plural protocol bridge modules of a serial attached SCSI (SAS) type, and the plurality of storage device connectors are connectable to storage devices having a SAS circuit and wherein the storage devices having the SAS circuit are configured to include storage media selected from a hard disk drive (HDD) or solid state drive (SSD).

7. The storage array of claim 5, wherein the bridge module interconnect is configured to receive plural protocol bridge modules of a non-volatile memory express (NVME) type, and the plurality of storage device connectors are connectable to storage devices having an NVME circuit.

8. The storage array of claim 7, wherein the storage devices having the NVME circuit NVME solid state drives (SSD).

9. The storage array of claim 8, wherein the motherboard further includes a bridge board module that provides a passive interface to a set of four NVME storage drives via two of the storage device connectors routed through the storage mid-plane, and to the first and second compute modules routed via eight PCIe lanes.

10. The storage array of claim 1, wherein each of the plurality of storage device connectors has a plurality of pins that are connected to the integrated routing of the storage mid-plane to provide connection to storage devices of different protocol types, and each storage device of a respective protocol type when connected to a respective storage device connector provides interconnection to a corresponding type of protocol bridge module when connected to ones of the bridge connections of the bridge module interconnect.

11. A storage array, comprising,
    a motherboard comprising:
    a first compute module;
    a second compute module, the first compute module provided for a first controller, and the second compute module provided for a second controller, wherein the first and second controllers provide failover compute processing for the storage array;
    an input/output (I/O) mid-plane routed to the first compute module and the second compute module, the I/O mid-plane having a plurality of peripheral component interconnect express (PCIe) lanes coupled to the first and second compute modules;

a bridge module interconnect routed to the I/O mid-plane via the plurality of PCIe lanes of the I/O mid-plane, the bridge module interconnect providing bridge connections to receive two or more types of protocol bridge modules, wherein the two or more types of protocol bridge modules are selected from a serial attached SCSI (SAS) protocol bridge module and a non-volatile memory express (NVME) protocol bridge module; and a storage mid-plane providing integrated routing between each of a plurality of drive connectors and each of the bridge connections of the bridge module interconnect.

12. The storage array of claim 11, wherein the first and second compute modules are to actively use select PCIe lanes of the plurality of PCIe lanes based on a type of protocol bridge modules coupled to the bridge connections of the bridge module interconnect and based on a type of protocol of one or more storage drives connected to the plurality of drive connectors.

13. The storage array of claim 11, wherein the plurality of drive connectors is configured with routing to each one of the bridge connections of the bridge module interconnect via the storage mid-plane, such that storage drives according to any of multiple protocol types connected to the plurality of drive connectors are provided with communication with a corresponding protocol bridge module of the two or more types of protocol bridge modules.

14. The storage array of claim 11, wherein the motherboard further includes a bridge board module that provides a passive interface to a predefined set of the plurality of drive connectors for interconnection to a predefined set of NVME storage drives.

15. The storage array of claim 11, wherein the bridge module interconnect is configured to receive two protocol bridge modules of a serial attached SCSI (SAS) type, and receive storage drives having a SAS circuit, and wherein the storage drives having the SAS circuit are configured to include storage media selected from a hard disk drive (HDD) or solid state drive (SSD), and wherein the motherboard further includes a bridge board module that provides a passive interface to a set of four NVME storage drives via two of the drive connectors routed through the storage mid-plane, and to the first and second compute modules routed via eight PCIe lanes.

16. The storage array of claim 11, wherein the bridge module interconnect is configured to receive two protocol bridge modules of a non-volatile memory express (NVME) type, and receive storage drives having an NVME circuit, and wherein the storage drives having the NVME circuit include NVME solid state drives (SSD).

17. The storage array of claim 11, wherein each of the plurality of drive connectors has a plurality of pins that are connected to the integrated routing of the storage mid-plane to provide connection to storage drives of different protocol types, and each storage drive of a respective protocol type when connected to a respective drive connector provides interconnection to a corresponding type of protocol bridge module when connected to one of the bridge connections of the bridge module interconnect.

18. The storage array of claim 1, wherein a first configuration of the plurality of different configurations includes a first type of protocol bridge module received by a bridge connection of the bridge connections, and a second configuration of the plurality of different configurations includes a second type of protocol bridge module received by a bridge connection of the bridge connections, the second type different from the first type.

19. The storage array of claim 18, wherein the first type of protocol bridge module is received by a first bridge connection of the bridge connections when storage devices of a first protocol type of the different protocol types of storage devices are connected to the plurality of storage device connectors, and the second type of protocol bridge module is received by a second bridge connection of the bridge connections when storage devices of a second protocol type of the different protocol types of storage devices are connected to the plurality of storage device connectors.

20. The storage array of claim 4, wherein the bridge module interconnect is flexibly configurable to a plurality of different configurations depending upon which of the two or more types of protocol bridge modules are received by the bridge connections of the bridge module interconnect.

* * * * *